United States Patent
Horizoe et al.

(10) Patent No.: US 9,840,675 B2
(45) Date of Patent: Dec. 12, 2017

(54) SYSTEM AND METHOD FOR RECOVERING GAS CONTAINING $CO_2$ AND $H_2S$

(71) Applicant: MITSUBISHI HEAVY INDUSTRIES, LTD., Tokyo (JP)

(72) Inventors: Kouji Horizoe, Tokyo (JP); Yuudai Katou, Tokyo (JP); Moritoshi Murakami, Tokyo (JP); Masaki Yushima, Hiroshima (JP); Kazuo Ishida, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 141 days.

(21) Appl. No.: 14/763,924

(22) PCT Filed: Jan. 22, 2014

(86) PCT No.: PCT/JP2014/051281
§ 371 (c)(1),
(2) Date: Jul. 28, 2015

(87) PCT Pub. No.: WO2014/129254
PCT Pub. Date: Aug. 28, 2014

(65) Prior Publication Data
US 2015/0361364 A1 Dec. 17, 2015

(30) Foreign Application Priority Data
Feb. 21, 2013 (JP) .................... 2013-032643

(51) Int. Cl.
*C01B 3/36* (2006.01)
*C10K 1/08* (2006.01)
(Continued)

(52) U.S. Cl.
CPC ............ *C10K 1/08* (2013.01); *B01D 53/1425* (2013.01); *B01D 53/1462* (2013.01);
(Continued)

(58) Field of Classification Search
CPC ..................................................... Y02C 10/06
See application file for complete search history.

(56) References Cited

U.S. PATENT DOCUMENTS

| | | | | |
|---|---|---|---|---|
| 3,725,529 A | * | 4/1973 | Giammarco | B01D 53/1425 423/223 |
| 4,052,176 A | * | 10/1977 | Child | B01D 53/1406 252/373 |

(Continued)

FOREIGN PATENT DOCUMENTS

| CA | 2 756 036 A1 | 10/2010 |
|---|---|---|
| CA | 2 711 435 A1 | 10/2012 |

(Continued)

OTHER PUBLICATIONS

English translation of Written Opinion dated Apr. 22, 2014, issued in counterpart application No. PCT/JP2014/051281 (5 pages).
(Continued)

*Primary Examiner* — Imran Akram
(74) *Attorney, Agent, or Firm* — Westerman, Hattori, Daniels & Adrian, LLP

(57) ABSTRACT

The system is provided with: a first heat exchanger which is interposed at an intersection between a rich solution supply line and a lean solution supply line, which has absorbed $CO_2$ and $H_2S$ extracted from a bottom portion of an absorber, and a regenerated absorbent; a second heat exchanger which is interposed at an intersection between a semi-rich solution supply line and a branch line branched at the branch portion C from the lean solution supply line, and the lean solution; a merging portion which merges a branch line configured to supply the lean solution after heat exchange with the lean solution supply line; and a flow rate adjusting valve which is interposed in the lean solution supply line to adjust the distribution amount of the lean solution.

1 Claim, 3 Drawing Sheets

(51) Int. Cl.
*C10K 1/00* (2006.01)
*C01B 17/16* (2006.01)
*B01D 53/14* (2006.01)
*B01D 53/18* (2006.01)
*B01D 53/52* (2006.01)

(52) U.S. Cl.
CPC ..... *B01D 53/1468* (2013.01); *B01D 53/1475* (2013.01); *B01D 53/185* (2013.01); *B01D 53/526* (2013.01); *C01B 17/167* (2013.01); *C10K 1/004* (2013.01); *C10K 1/005* (2013.01); *B01D 2252/204* (2013.01); *B01D 2252/2026* (2013.01); *B01D 2252/20484* (2013.01); *B01D 2252/20489* (2013.01); *B01D 2256/245* (2013.01); *Y02C 10/06* (2013.01); *Y02P 20/152* (2015.11)

(56) References Cited

U.S. PATENT DOCUMENTS

| | | | | |
|---|---|---|---|---|
| 4,324,567 | A * | 4/1982 | Ranke | B01D 53/14 95/161 |
| 4,609,389 | A * | 9/1986 | Karwat | B01D 53/14 62/625 |
| 2006/0043000 | A1* | 3/2006 | Gaskin | B01D 53/1425 208/177 |
| 2006/0110300 | A1* | 5/2006 | Mak | B01D 53/1456 62/625 |
| 2006/0286017 | A1* | 12/2006 | Hakka | B01D 53/1475 423/220 |
| 2010/0083696 | A1* | 4/2010 | Hoang-Dinh | B01D 53/1425 62/611 |
| 2010/0101416 | A1* | 4/2010 | Akiyama | B01D 53/1425 95/193 |
| 2011/0041685 | A1* | 2/2011 | Tanaka | B01D 53/1412 95/16 |
| 2011/0120315 | A1* | 5/2011 | Iijima | B01D 53/1406 96/242 |
| 2012/0014861 | A1* | 1/2012 | Hirata | B01D 53/1425 423/437.1 |
| 2013/0192470 | A1* | 8/2013 | Iijima | B01D 53/1425 96/242 |
| 2013/0247755 | A1* | 9/2013 | Horizoe | B01D 53/1462 95/8 |
| 2014/0369913 | A1* | 12/2014 | Nakamura | B01D 53/62 423/220 |

FOREIGN PATENT DOCUMENTS

| | | | | |
|---|---|---|---|---|
| CN | 102671510 A | 9/2012 | | |
| CN | 102794084 A | 11/2012 | | |
| JP | 2003-190739 A | 7/2003 | | |
| JP | 2010-120013 A | 6/2010 | | |
| JP | 2012-20265 A | 2/2012 | | |
| JP | 2012-110835 A | 6/2012 | | |
| JP | WO 2013161100 A1 * | 10/2013 | ............. | B01D 53/62 |
| JP | 2013-226476 A | 11/2013 | | |

OTHER PUBLICATIONS

Office Action dated Feb. 3, 2016, issued in counterpart Chinese Patent Application No. 201480005705.0, with English translation (13 pages).
Notice of Acceptance dated May 25, 2016, issued in counterpart Australian Patent Application No. 2014220048. (2 pages).
Decision of a Patent Grant dated Jul. 26, 2016, issued in counterpart Japanese Patent Application No. 2013-032643, with English translation. (5 pages).
International Search Report dated Apr. 22, 2014, issued in counterpart International Application No. PCT/JP2014/051281 (1 page).
Written Opinion of the International Searching Authority dated Apr. 22, 2014, issued in counterpart International Application No. PCT/JP2014/051281 (4 pages).

* cited by examiner

SYSTEM AND METHOD FOR RECOVERING GAS CONTAINING $CO_2$ AND $H_2S$

FIELD

The present invention relates to a recovery system and method of a gas containing $CO_2$ and $H_2S$ for efficiently recovering $H_2S$ from $CO_2$ and $H_2S$ contained in a gasified gas that is obtained, for example, by gasifying a coal, a biomass or the like by a gasification furnace.

BACKGROUND

As a technique for removing an acid gas such as $CO_2$ and $H_2S$ contained in the gasified gas obtained by gasifying the coal, the biomass or the like in the gasification furnace, conventionally, a chemical absorption method (for example, an amine absorbent (for example, using (absorbent such as N-methyldiethanolamine: MDEA)) and a physical absorption method (for example, using Selexol absorbent using polyethylene glycol dimethyl ether) have been suggested.

Incidentally, in the case of a system such as an integrated coal gasification combined cycle (IGCC) technique, there are demands as follows.

1) In a power generation system, in order to set the discharge of $SO_x$ as air pollutants to a level less than a regulation value, it is necessary to remove $H_2S$ that is a generation source of $SO_x$. Meanwhile, since there is an effect of enhancing the power generation efficiency, it is desirable that $CO_2$ should not be recovered as much as possible.

2) A small flow rate of recovered $H_2S$-containing gas (off-gas) and a high $H_2S$ density are advantageous for the case of manufacturing chemical products from the recovered gas and the case of processing $H_2S$, and it is desirable to be able to selectively recover $H_2S$.

3) In a system that combines the CO shift and CCS (recovery and storage of carbon dioxide) in the IGCC, it is necessary to suppress the $H_2S$ density in $CO_2$ recovered by the $CO_2$ recovery process approximately to a specified value (for example, 10 to 20 ppm).

4) In order to improve the power generation efficiency, the amount of use of heat energy such as steam is preferably as small as possible.

That is, it is required to efficiently and selectively separate $H_2S$ from the gas containing $CO_2$ and $H_2S$ in terms of thermal energy.

Therefore, conventionally, there has been a suggestion of an energy-saving process which supplies a part of the absorbent, in which dissolved components are partly dissipated in a pressure discharge vessel (regenerator upper stage), from the lower part of the uppermost part of the absorber (Patent Literature 1).

The technique of Patent Literature 1 is effective in the case of being applied to the $CO_2$ recovery from the gas containing no $H_2S$. However, in the case of being applied to the selective recovery of $H_2S$ from the gas containing $CO_2$ and $H_2S$, the $H_2S$ density in the absorbent in the lower part of the absorber increases, and the $H_2S$ absorption rate is greatly reduced. Accordingly, there is a problem in that the $H_2S$ removal ratio and the $H_2S$ selectivity are lowered, and in order to obtain the desired removal ratio, on the contrary, an increase in thermal energy is caused.

Thus, the inventors have previously suggested a technique which extracts a part of the absorbent from the middle of the absorption portion of the absorber and supplies the absorbent, which absorbs $CO_2$ and $H_2S$ at a relatively low density, to the middle of a regeneration portion of the regenerator (Patent Literature 2).

CITATION LIST

Patent Literature

Patent Literature 1: Japanese Patent Application Laid-open No. 2010-120013
Patent Literature 2: Japanese Patent Application Laid-open No. 2012-110835

SUMMARY

Technical Problem

In the suggestion of Patent Literature 2, although it is possible to improve the selective absorptivity of $H_2S$ and reduce the regenerative heat energy consumption compared to the conventional process by about 10%, the further reduction of consumption thermal energy is required.

Thus, there is an earnest desire for an appearance of a system that is capable of efficiently and selectively separating $H_2S$ in terms of thermal energy from the gas containing $CO_2$ and $H_2S$ apart from the absorption of $CO_2$ in the chemical absorption process.

In view of the above-mentioned problems, an object of the present invention is to provide a recovery system and a recovery method of a gas containing $CO_2$ and $H_2S$ that efficiently recover $H_2S$ contained in the gasified gas obtained by gasifying, for example, the coal, the biomass or the like by a gasification furnace.

Solution to Problem

According to a first aspect of the present invention in order to solve the above-mentioned problems, there is provided a system for recovering a gas containing $CO_2$ and $H_2S$, including: an absorber which brings an introduction gas containing $CO_2$ and $H_2S$ into contact with an absorbent which absorbs $CO_2$ and $H_2S$ to absorb $CO_2$ and $H_2S$ from the introduction gas; an absorbent regenerator which extracts the absorbent, which has absorbed $CO_2$ and $H_2S$, from a bottom portion of the absorber, introduces the absorbent from a top portion side via a rich solution supply line, and releases $CO_2$ and $H_2S$ by the heat of a reboiler to regenerate the absorbent; a lean solution supply line which returns the regenerated absorbent to the absorber; a semi-rich solution supply line which extracts the absorbent, which has absorbed a part of $CO_2$ and $H_2S$ from the vicinity of a middle stage of the absorber, and introduces the extracted absorbent into the vicinity of the middle stage of the regenerator; a first heat exchanger which is interposed at an intersection between the rich solution supply line and the lean solution supply line to perform the heat exchange between the absorbent, which has absorbed $CO_2$ and $H_2S$ extracted from the bottom portion of the absorber, and the regenerated absorbent; a second heat exchanger which is interposed at an intersection between the semi-rich solution supply line and a branch line branched at a branch portion of the lean solution supply line to perform heat exchange between the absorbent, which has absorbed $CO_2$ and $H_2S$ extracted from the vicinity of the middle stage of the absorber, and the regenerated absorbent; a merging portion which merges the branch line configured to supply the lean solution after the heat exchange in the second heat exchanger with the lean solution supply line; and a flow rate adjusting valve which is interposed in the lean solution supply line to adjust a distribution amount of the lean solution.

According to a second aspect of the present invention, there is provided the system for recovering a gas containing $CO_2$ and $H_2S$ according to the first aspect, including: a first bypass line which bypasses the rich solution from the rich solution supply line side to the semi-rich solution supply line side on an upstream side of the first heat exchanger interposed in the rich solution supply line and introduces the rich solution to the second heat exchanger; a second bypass line which returns the rich solution, which is bypassed and heat-exchanged to the rich solution supply line side from the semi-rich solution supply line side on a downstream side of the second heat exchanger interposed in the semi-rich solution supply line, to the rich solution supply line; a control unit which performs the control of switching the bypass line by a gas type information to be introduced; and a flow rate adjusting valve which is provided on an extraction side of the semi-rich solution supply line, and stops the extraction of the semi-rich solution by the command from the control unit.

According to a third aspect of the present invention, there is provided a method for recovering a gas containing $CO_2$ and $H_2S$ using an absorber and a regenerator which recover $CO_2$ and $H_2S$ from a gas containing $CO_2$ and $H_2S$, the method including: extracting a part of an absorbent from the vicinity of a middle stage of the absorber configured to absorb $CO_2$ and $H_2S$ from the introduction gas, and reducing a flow rate of the absorbent flowing down below the absorber; introducing the absorbent, which is extracted from a bottom portion of the absorber, from the vicinity of a top portion of the regenerator, and introducing and regenerating the absorbent extracted from the vicinity of the middle stage of the absorber into the vicinity of the middle stage of the regenerator; performing the heat exchange of the absorbent extracted from the bottom portion with the lean solution from the regenerator using a first heat exchanger; branching the lean solution on the upstream side of the first heat exchanger, performing the heat exchange of the branched lean solution with the absorbent extracted from the vicinity of the middle stage of the absorber using a second heat exchanger, merging the lean solution after the heat exchange with the lean solution obtained by heat exchange in the first heat exchanger, and introducing the merged lean solution into the absorber so as to be reused.

According to a fourth aspect of the present invention, there is provided the method for recovering a gas containing $CO_2$ and $H_2S$ according to the third aspect, wherein a bypass line configured to introduce the rich solution into the second heat exchanger during operation of not extracting a semi-rich solution is provided, a part of the rich solution is introduced into the second heat exchanger, and the heat exchange is performed in the second heat exchanger by the branched lean solution.

Advantageous Effects of Invention

In accordance with the present invention, by reducing the flow rate of the absorbent flowing down below the absorber so as to extract a part of the absorbent from the vicinity of the middle stage of the absorber by a semi-rich solution supply line, it is possible to lower the $CO_2$ absorption amount without substantially lowering the absorption amount of $H_2S$, to improve the selective separation characteristics of $H_2S$, and to reduce the reboiler heat capacity in the regenerator.

Moreover, the regenerated absorbent flowing through the lean solution supply line is branched, the rich solution to be introduced is heat-exchanged in the first heat exchanger interposed in the lean solution supply line, a part of the lean solution is caused to flow into a branch line side branched by the branch portion, the semi-rich solution is heat-exchanged by the second heat exchanger interposed in the branch line, and the reduction of the sizes of the first and second heat exchangers is promoted.

DESCRIPTION OF EMBODIMENTS

The present invention will be described in detail below with reference to the accompanying drawings. The present invention is not to be limited to the examples. In addition, constituent elements in the examples include those that can be easily assumed by a person skilled in the art or those that are substantially identical.

FIRST EXAMPLE

Figure 1:
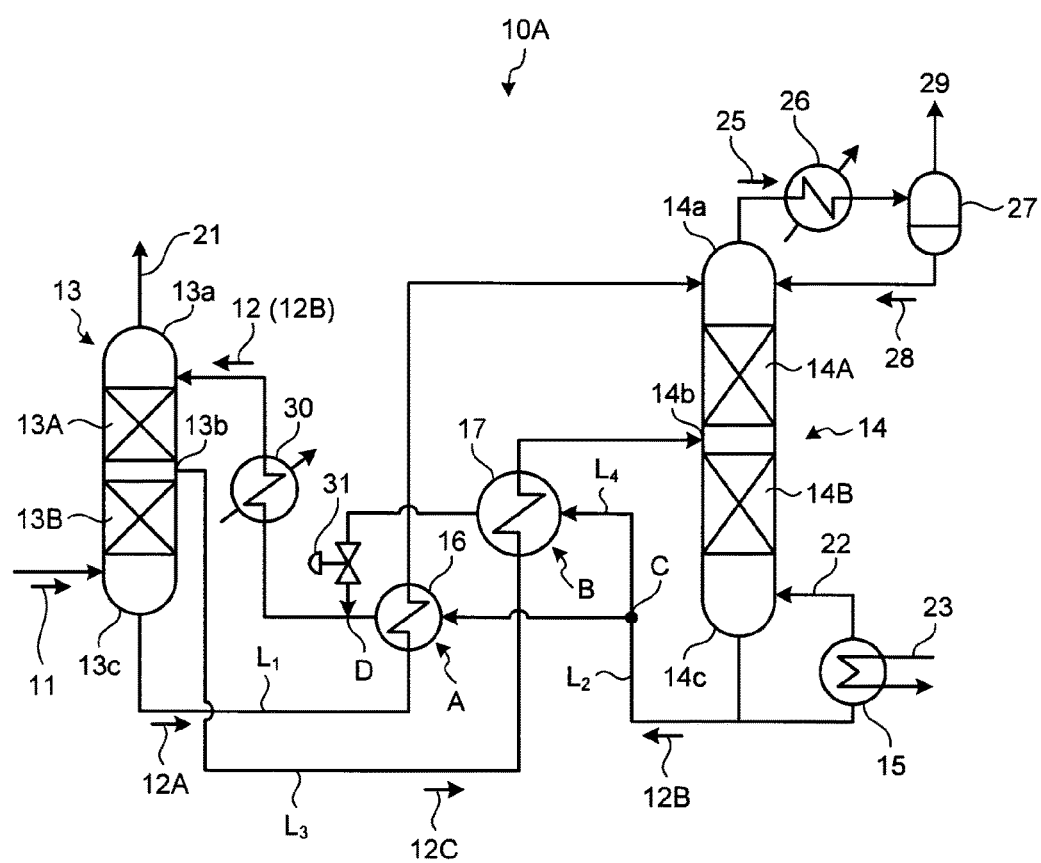
FIG. 1 is a schematic diagram of a recovery system of a gas containing $CO_2$ and $H_2S$ according to a first embodiment.
Figure 2:
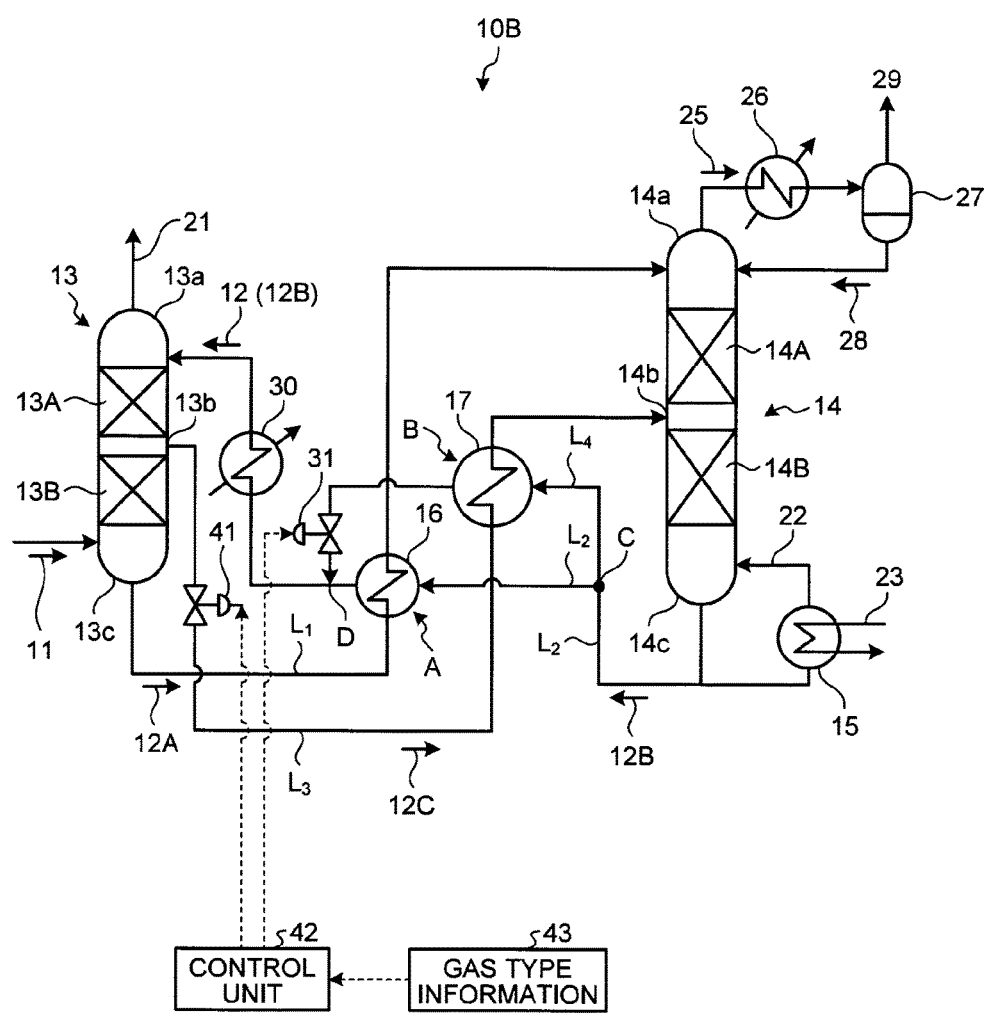
FIG. 2 is a schematic diagram of the recovery system of other gases containing $CO_2$ and $H_2S$ according to the first example.

A system for recovering a gas containing $CO_2$ and $H_2S$ according to an example of the present invention will be described with reference to the drawings. FIG. 1 is a schematic diagram of a system for recovering a gas containing $CO_2$ and $H_2S$ according to a first example. FIG. 2 is a schematic diagram of another system for recovering a gas containing $CO_2$ and $H_2S$ according to the first example.

As illustrated in FIG. 1, a recovery system 10A of the gas containing $CO_2$ and $H_2S$ according to this example includes: an absorber 13 which uses a gasified gas containing $CO_2$ and $H_2S$ obtained from a gasification furnace for gasifying, for example, the coal, the biomass or the like, as an introduction gas 11, and brings the introduction gas 11 into contact with an absorbent 12 which absorbs $CO_2$ and $H_2S$ to absorb $CO_2$ and $H_2S$ from the introduction gas 11; an absorbent regenerator (hereinafter, referred to as a "regenerator") 14 which extracts an absorbent (rich solution) 12A, which has absorbed $CO_2$ and $H_2S$ from a bottom portion 13c of the absorber 13, introduces the absorbent from a top portion 14a via a rich solution supply line $L_1$, and releases $CO_2$ and $H_2S$ by the heat of a reboiler 15 to regenerate the absorbent 12; a lean solution supply line $L_2$ which extracts a regenerated absorbent (lean solution) 12B from a bottom portion 14c of the regenerator 14 and returns the regenerated absorbent to a top portion 13a of the absorber 13; a semi-rich solution supply line $L_3$ which extracts an absorbent (semi-rich solution) 12C which has absorbed a part of $CO_2$ and $H_2S$ from the vicinity of a middle stage 13b of the absorber 13, and introduces the extracted semi-rich solution 12C to the vicinity of the middle stage 14b of the regenerator 14; a first heat exchanger 16 which is interposed at an intersection A between the rich solution supply line $L_1$ and the lean solution supply line $L_2$ to perform heat exchange between the absorbent (rich solution 12A), which has absorbed $CO_2$ and $H_2S$ extracted from the bottom portion 13c of the absorber 13, and the regenerated absorbent (lean solution 12B); a second heat exchanger 17 which is interposed at an intersection B between the semi-rich solution supply line $L_3$ and a branch line $L_4$ branched at a branch portion C of the lean solution supply line $L_2$ to perform heat exchange between the semi-rich solution 12C as the absorbent, which has absorbed $CO_2$ and $H_2S$ extracted from the vicinity of the middle stage 13b of the absorber 13, and the lean solution 12B; a merging portion D which merges the branch line $L_4$ configured to supply the lean solution 12B after heat exchange in the second heat exchanger 17 with the lean solution supply line $L_2$; and a flow rate adjusting valve 31 which is interposed in the lean solution supply line $L_2$ to adjust a distribution amount of the lean solution 12B.

In this system, $CO_2$ and $H_2S$ are removed in the regenerator 14 and the regenerated absorbent (lean solution) 12B is reused as the absorbent 12.

In a purifying method using the recovery system 10A of the gas containing $CO_2$ and $H_2S$, the gasified gas obtained in the gasification furnace for gasifying the coal, the biomass, or the like is sent to a gas cooling device (not illustrated), is cooled here by the cooling water and is introduced into the absorber 13 as the introduction gas 11.

Filling portions 13A, 13B are provided inside the absorber 13 to improve the countercurrent contact efficiency of the introduction gas 11 and the absorbent 12, when passing through the filling portions 13A, 13B. In addition, a plurality of filling portions may be provided, and the countercurrent contact between the introduction gas 11 and the absorbent 12 may be performed, for example, by a spray method, a liquid column method, a tray method or the like other than the filling method.

In the absorber 13, the introduction gas 11 comes into countercurrent contact with, for example, the amine-based absorbent 12, $CO_2$ and $H_2S$ in the introduction gas 11 are absorbed to the absorbent 12 by a chemical reaction, and a purified gas 21 from which $CO_2$ and $H_2S$ are removed is discharged out of the system. The absorbent which has absorbed $CO_2$ and $H_2S$ is also referred to as "rich solution" 12A. The rich solution 12A is heated by being heat-exchanged with the lean solution 12B regenerated by the regenerator 14 in the first heat exchanger 16 provided at the intersection A via a rich solution pump (not illustrated), and is supplied to the top portion 14a side of the regenerator 14.

When the rich solution 12A introduced from the top portion 14a side is introduced into the regenerator from the vicinity of the top portion 14a of the regenerator 14 having filling portions 14A and 14B by a spraying means (not illustrated) or the like and flows down in the regenerator, an endothermic reaction due to water vapor 22 from the reboiler 15 is generated, and most of $CO_2$ and $H_2S$ is released and the absorbent is regenerated. The absorbent, which has released a part or the most of $CO_2$ and $H_2S$ in the regenerator 14, is referred to as "semi-lean solution". When reaching the lower part of the absorbent regenerator 14, the semi-lean solution becomes the absorbent in which substantially all of $CO_2$ and $H_2S$ have been removed. The absorbent regenerated by the removal of substantially all of $CO_2$ and $H_2S$ is referred to as "lean solution" 12B. The lean solution 12B is indirectly heated by saturated water vapor 23 in the reboiler 15, generates the water vapor 22, and is returned to the bottom portion side of the regenerator 14.

Further, $CO_2$ and $H_2S$ gas 25 accompanied by water vapor released from the rich solution 12A and the semi-rich solution 12C in the regenerator is derived from the top portion 14a of the regenerator 14, the water vapor is condensed by a condenser 26, water 28 is separated by a separation drum 27, and $CO_2$ and $H_2S$ gas 29 is released to the outside of the system and recovered. The water 28 separated by the separation drum 27 is supplied to the top portion 14a of the regenerator 14.

Here, the extracted semi-rich solution 12C is heated by heat exchange with the high-temperature lean solution 12B extracted from the bottom portion 14c of the regenerator 14 by the second heat exchanger 17 provided at the intersection B, and is supplied to the vicinity of the middle stage 14b of the regenerator 14, and more preferably, to the lower side of the middle stage 14b.

Here, in this example, the lean solution 12B flowing through the lean solution supply line $L_2$ is branched and is heat-exchanged with the rich solution 12A which flows as it is, in the first heat exchanger 16 interposed in the lean solution supply line $L_2$. In contrast, a part of the lean solution 12B is allowed to flow into the branch line $L_4$ side which is branched at the branch portion C, and the semi-rich solution 12C is heat-exchanged in the second heat exchanger 17 interposed in the branch line $L_4$.

In addition, the distribution amount of the lean solution 12B is appropriately changed, depending on the amount of extraction of the semi-rich solution 12C, by the flow rate adjusting valve 31.

Thus, in this example, the regenerated absorbent (lean solution) 12B is introduced into the first heat exchanger 16 and second heat exchanger 17 which are provided in parallel.

Moreover, the absorbent (lean solution) 12B is heat-exchanged with the rich solution 12A in the first heat exchanger 16 to warm the rich solution 12A. Further, the absorbent (lean solution) 12B is heat-exchanged with the semi-rich solution 12C in the second heat exchanger 17 to warm the semi-rich solution 12C.

In addition, thereafter, the cooled lean solution 12B is merged at the merging portion D, the pressure is subsequently increased in a lean solvent pump (not illustrated), and after the lean solution is further cooled by a lean solvent cooler 30, it is supplied to the absorber 13 again and is reused as the absorbent 12.

Thus, in this example, since the rich solution 12A and the semi-rich solution 12C are heat-exchanged by the lean solution 12B by a parallel type arrangement, rather than the heat exchange by the series type arrangement suggested in conventional Patent Literature 2, the heat exchange capacity of the first heat exchanger 16 and the second heat exchanger 17 can be made more compact than the related art.

As a result, as in this example, by installing the parallel type heat exchanger, the deviation of $\Delta T$ is reduced to increase the exchange heat capacity of the heat exchanger.

In addition, it is preferable that a difference in the flow rate between the lean solution 12B of the high-temperature fluid supplied to the first and second heat exchangers 16 and 17, and the rich solution 12A and the semi-rich solution 12C of the low-temperature fluid be within ±10%.

Here, the adjustment of the flow rate of the branch amount is performed using the flow rate adjusting valve 31, and the opening degree thereof is usually adjusted to be the same as the flow rate of the rich solution 12A and the lean solution 12B.

Here, since the gas composition of the introduction gas 11 varies depending on the type of fuel supplied to the boiler, as in a recovery system 10B of the gas containing $CO_2$ and $H_2S$ illustrated in FIG. 2, gas type information 43 is acquired by a control unit 42, and the opening degree of an extraction valve 41 is adjusted based on the information, thereby being able to appropriately change the amount of extraction of the semi-rich solution 12C.

Furthermore, the temperature of the absorbent (semi-rich solution) 12C, which has absorbed $CO_2$ and $H_2S$ introduced from the vicinity of the middle stage 14b of the regenerator 14 after the heat exchange, is set to be equal to or higher than the temperature of the absorbent (rich solution) 12A which has absorbed $CO_2$ and $H_2S$ introduced from the top portion 14a of the regenerator 14 after the heat exchange in the second heat exchanger 17.

The reason is because the temperature of the middle stage 14b portion is higher than the top portion 14a of the regenerator 14 due to the heat of the water vapor 22 from the reboiler 15, and thus, the temperature of the semi-rich solution 12C introduced here needs to be equal to or higher than that of the top portion 14a side so that the heat loss does not occur.

In this example, a part of the absorbent 12 is extracted from the vicinity of the middle stage 13b below the uppermost stage of the absorber 13 by the semi-rich solution supply line $L_3$. In addition, the extraction amount is adapted to measure the temperature, the pressure, the flow rate, the $CO_2$ density, the $H_2S$ density or the like of the introduction gas 11 to be introduced, and collectively determine these conditions, thereby determining an optimum extraction position and extraction amount.

Incidentally, $H_2S$ and $CO_2$ in the introduction gas 11 are absorbed by the absorbent 12 together with $H_2S$ and $CO_2$ within the absorber 13.

As in the present invention, by reducing the flow rate of the absorbent flowing down below the absorber 13 so as to extract a part of the absorbent 12 from the vicinity of the middle stage 13b of the absorber 13 by the semi-rich solution supply line $L_3$, since the mass transfer of the gas side is dominant in $H_2S$ and the mass transfer of the liquid side is dominant in $CO_2$, the absorption rate of $CO_2$ is further lowered.

Thus, as the $CO_2$ absorption amount is lowered, that is, the $CO_2$ density in the absorbent is lowered, the absorption amount of $H_2S$ increases.

Even in consideration of a decrease in the $H_2S$ absorption amount due to a decrease in the flow rate of the absorbent, the $H_2S$ absorption amount hardly decreases. Therefore, it is possible to improve the selectivity of $H_2S$.

TEST EXAMPLE

Table 1 is a comparison of the load of the reboiler of each regenerator, the load of the first heat exchanger 16, and the load of the second heat exchanger 17, in the parallel arrangement type heat exchanger recovery system of the example and the recovery system of the series arrangement type heat exchanger of the conventional example.

In the conventional example (Patent Literature 2), the rich solution 12A and the semi-rich solution 12C are heat-exchanged by the lean solution 12B in the first heat exchanger (rich solution heat exchanger) 16 and the second heat exchanger (semi-rich solution heat exchanger) 17.

Although the process of the conventional example (Patent Literature 2) individually performs the heat exchange between the rich solution 12A and the lean solution 12B, and the heat exchange between the semi-rich solution 12C and the lean solution 12B by the series type, since the flow rate of the rich solution 12A and the semi-rich solution 12C is smaller (about half) than the lean solution 12B, the deviation occurs in $\Delta T$, and the exchange heat capacity in the heat exchanger is not sufficient.

In contrast, in this example, by providing the complex type heat exchanger, the deviation of $\Delta T$ is reduced, and the heat exchange capacity in the heat exchanger is increased.

TABLE 1

|  | Example | Conventional Example |
|---|---|---|
| Reboiler load | 0.94 | 1 |
| Load of first heat exchanger (16) | 2.15 | 1 |
| Load of second heat exchanger (17) | 0.99 | 1 |
| Load of condenser (26) | 1.35 | 1 |
| Load of the lean solvent cooler (30) | 0.49 | 1 |

As illustrated in Table 1, in the recovery system of this example, it was possible to reduce the reboiler load as compared to the conventional example.

SECOND EXAMPLE

Figure 3:
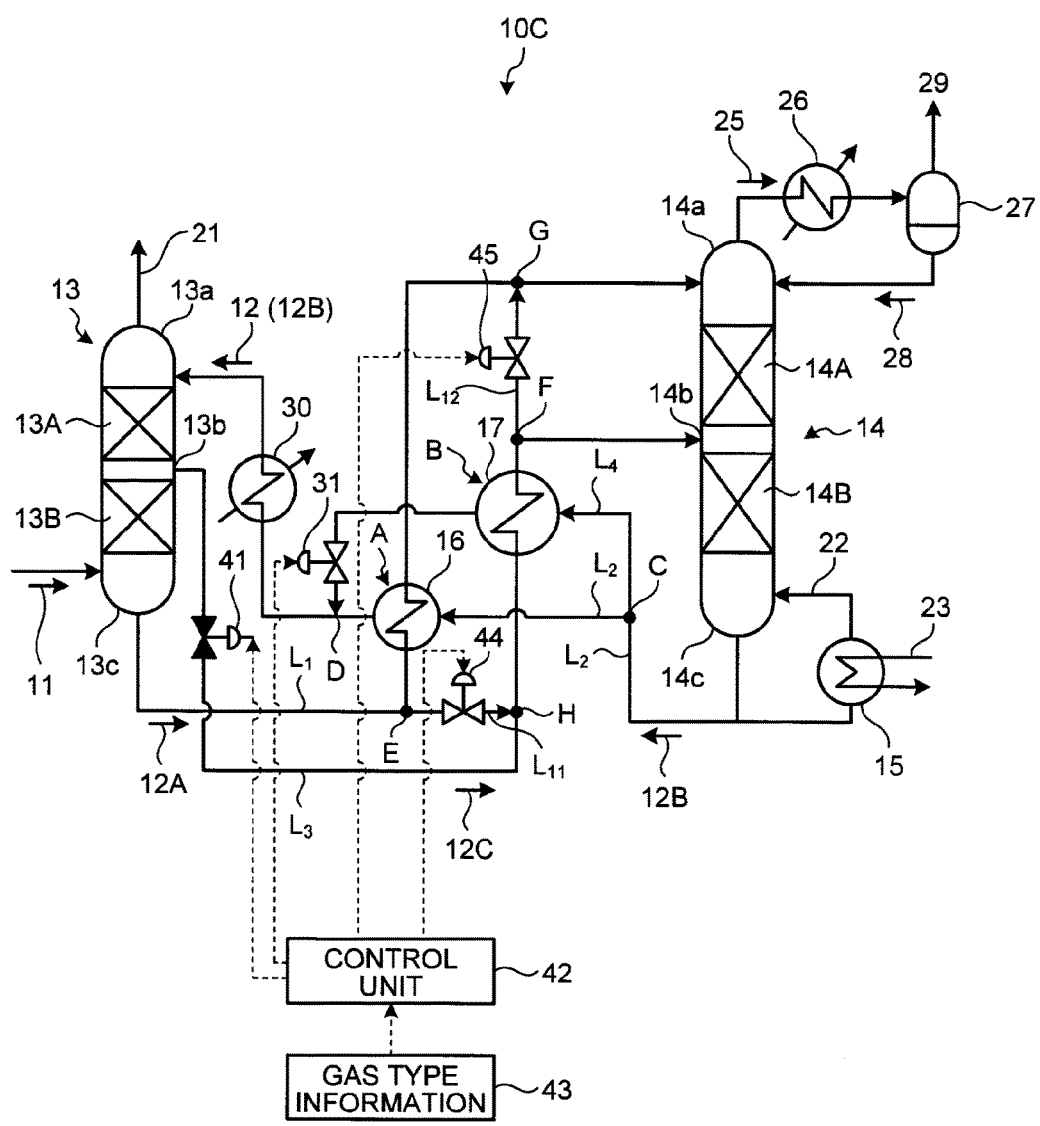
FIG. 3 is a schematic diagram of the recovery system of the gas containing $CO_2$ and $H_2S$ according to a second example.

A system for recovering a gas containing $CO_2$ and $H_2S$ according to an example of the present invention will be described with reference to the drawings. FIG. 3 is a schematic diagram of a system for recovering a gas containing $CO_2$ and $H_2S$ according to a second example.

As illustrated in FIG. 3, a recovery system 10C of the gas containing $CO_2$ and $H_2S$ according to this example is provided with a first bypass line $L_{11}$ which extracts and bypasses the rich solution 12A from the rich solution supply line $L_1$ side to the semi-rich solution supply line $L_3$ side at a branch portion E of the upstream side of the first heat exchanger 16 interposed in the rich solution supply line $L_1$ and introduces the rich solution 12A to the second heat exchanger 17; a second bypass line $L_{12}$ which returns the rich solution 12A, which is bypassed and heat-exchanged to the rich solution supply line $L_1$ side from the semi-rich solution supply line $L_3$ side by the branch portion F, to the rich solution supply line $L_1$ by a merging portion G on the downstream side of the second heat exchanger 17 interposed in the semi-rich solution supply line $L_3$; a control unit 42 which performs the control of switching the bypass line by gas type information 43 to be introduced; and a flow rate adjusting valve 41 which is provided on the extraction side of the semi-rich solution supply line $L_3$, and stops the extraction of the semi-rich solution 12C by the command from the control unit 42.

In addition, opening and closing valves 44 and 45 in the drawings are each interposed in the first bypass line $L_{11}$ and the second bypass line $L_{12}$.

For example, when there is a variation in the gas type due to a difference in the fuel supplied to the boiler, and at the time of startup of the plant, there is a case of performing the operation that does not extract the semi-rich solution 12C from the middle of the absorber 13.

In such an operating state, although the rich solution 12A is extracted from the bottom portion 13c, the amount of extraction increases as much as the extraction stop of the semi-rich solution 12C.

As in the first example, when the first heat exchanger 16 and the second heat exchanger 17 are disposed in parallel and are designed so as to operate the supply amount of the lean solution 12B to each of the heat exchangers at a predetermined distribution ratio, since the capacity of the heat exchanger is compact, the insufficient heat exchange is caused.

Therefore, as in this example, when the semi-rich solution 12C is not extracted, the bypass lines (the first bypass line $L_{11}$ and the second bypass line $L_{12}$) are provided so that the rich solution 12A is introduced into the second heat exchanger 17 configured to exchange heat of the semi-rich solution 12C, and the rich solution 12A can be heat-exchanged using the lean solution 12B supplied to the second heat exchanger 17.

As a result, during the extraction operation of the rich solution 12A, since it is heat-exchanged using the first and second heat exchangers 16 and 17, unlike the conventional serial type similar to the first example, the exchange heat capacity increases, and it is possible to reduce the thermal energy consumption in the regenerator 14.

Moreover, even during operation that does not extract the semi-rich solution 12C, by introducing a part of the rich solution 12A into the second heat exchanger 17 by the bypass line, a sufficient exchange heat capacity can be obtained, while maintaining the capacity of the first heat exchanger 16 provided in the first example.

In FIG. 3, by closing the flow rate adjusting valve 41, the extraction of the semi-rich solution 12C is stopped. Moreover, the opening and closing valves 44 and 45 are opened to introduce a part of the rich solution 12A into the first bypass line $L_{11}$ and the second bypass line $L_{12}$, and the heat exchange is performed by the lean solution 12B branched at the branch portion C in the second heat exchanger 17. The rich solution 12A after the heat exchange is introduced into the merging portion G via the second bypass line $L_{12}$, merges here with the rich solution 12A subjected to the heat exchange in the first heat exchanger 16, and then is introduced into the top portion 14a side of the regenerator 14 to perform the regeneration process.

As a result, even during operation that does not extract the semi-rich solution 12C (only extracts the rich solution 12A), it is possible to obtain the sufficient exchange heat capacity using the first and second heat exchangers 16, 17 in the same manner as in the first example.

By adopting this example, the heat recovery amount from the lean solution 12B increases, and along with this, it is possible to reduce the load of the lean solvent cooler 30.

REFERENCE SIGNS LIST 10A-10C RECOVERY SYSTEM OF GAS CONTAINING $CO_2$ AND $H_2S$
11 INTRODUCTION GAS
12 ABSORBENT
12A RICH SOLUTION
12B LEAN SOLUTION
12C SEMI-RICH SOLUTION
13 ABSORBER
14 ABSORBENT REGENERATOR (REGENERATOR)
15 REBOILER
16 FIRST HEAT EXCHANGER
17 SECOND HEAT EXCHANGER

The invention claimed is:

1. A method for recovering a gas containing $CO_2$ and $H_2S$ using an absorber and a regenerator which recover $CO_2$ and $H_2S$ from an introduction gas containing CO2 and $H_2S$, the method comprising:
   extracting a part of an absorbent from the vicinity of a middle stage of the absorber as a semi-rich solution which has absorbed a part of $CO_2$ and $H_2S$ from the introduction gas to reduce a flow rate of the absorbent flowing down below the absorber, and introducing the semi-rich solution into the vicinity of a middle stage of the regenerator to be regenerated;
   extracting the absorbent from a bottom portion of the absorber as a rich solution which has absorbed $CO_2$ and $H_2S$ from the introduction gas, and introducing the rich solution into the vicinity of a top portion of the regenerator to be regenerated;
   extracting the regenerated absorbent from a bottom of the regenerator as a lean solution which has released CO2 and H2S;
   performing heat exchange of the rich solution with the lean solution in a first heat exchanger;
   branching the lean solution prior to the heat exchange in the first heat exchanger;
   performing heat exchange of the branched lean solution with the semi-rich solution in a second heat exchanger; and
   merging the branched lean solution after the heat exchange in the second heat exchanger with the lean solution after the heat exchange in the first heat exchanger, and introducing the merged lean solution into the vicinity of a top portion of the absorber so as to be reused;
   wherein a part of the rich solution is introduced into the second heat exchanger through a bypass line during operation of not extracting the semi-rich solution, and is subjected to heat exchange with the branched lean solution in the second heat exchanger.

* * * * *